Figure 1:
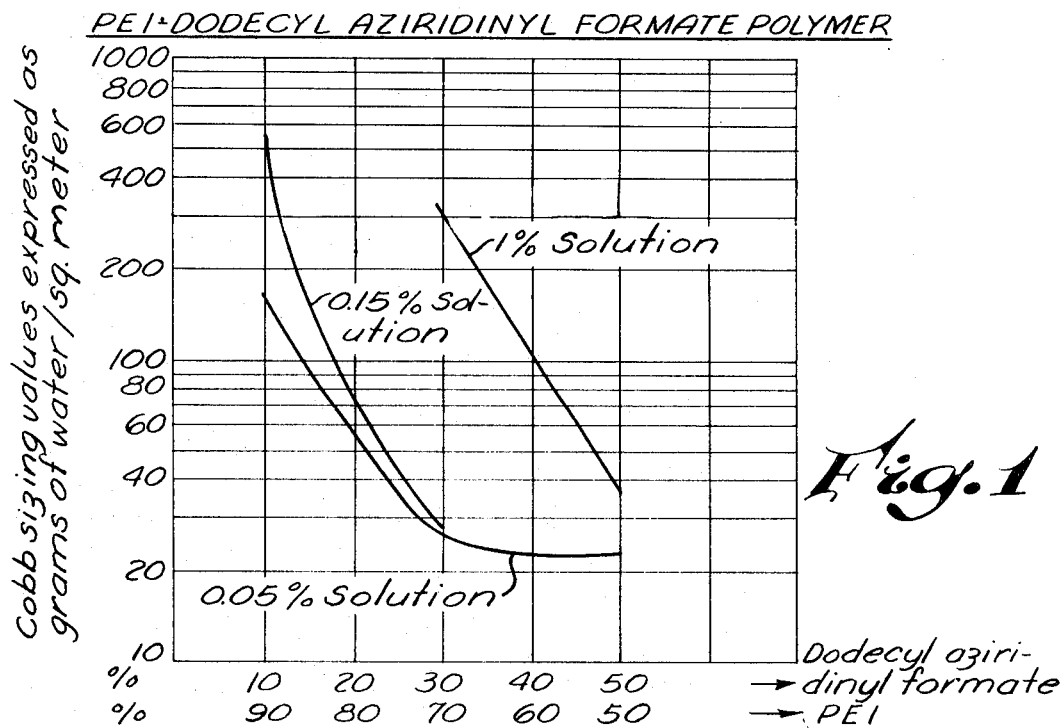

United States Patent
Longoria, III et al.

[15] 3,635,842

[45] Jan. 18, 1972

[54] SHORT LIFE PAPER SIZE FROM MODIFIED POLYALKYLENE-IMINES

[72] Inventors: Juan Longoria, III; William P. Coker, both of Lake Jackson, Tex.

[73] Assignee: The Dow Chemical Company, Midland, Mich.

[22] Filed: June 27, 1966

[21] Appl. No.: 560,640

[52] U.S. Cl..................260/2 BP, 117/155 R, 162/168, 260/2 EN, 260/29.2 EP, 260/29.2 N, 260/482 R, 260/584 R, 260/959
[51] Int. Cl...............................................C08g 33/08
[58] Field of Search.................260/2 EP, 2 EN, 2 P, 47 EP, 260/561, 584, 959, 482; 117/155; 162/168

[56] References Cited

UNITED STATES PATENTS

| | | | |
|---|---|---|---|
| 2,272,489 | 2/1942 | Ulrich | 260/239 |
| 2,296,225 | 9/1942 | Ulrich | 260/239 |
| 2,852,467 | 9/1958 | Hollyday | 252/34 |
| 3,277,128 | 10/1966 | Van der Voort | 260/404.5 |
| 3,355,437 | 11/1967 | Tesoro et al. | 260/77.5 |

OTHER PUBLICATIONS

L. E. Davis, " Polyethylenimine" in Davidson–Sittig Water-Soluble Resins, 2nd ed., 1966, Reinhold, pp. 216– 219 and 222– 223.

*Primary Examiner*—William H. Short
*Assistant Examiner*—E. Nielsen
*Attorney*—Griswold & Burdick and Theodore Post

[57] ABSTRACT

Unique water-soluble polymers are prepared by reacting a polyalkylenepolyamine or a polyalkylenimine with an epoxide or an activated aziridine; the epoxide and aziridine rings are each connected to a hydrocarbon radical having at least eight carbon atoms through generally an ether, ester, carboxamide or phosphoramide linkage. The polymers are particularly useful as temporary paper sizes, i.e., the polymers impart a sizing effect which disappears after some days without affecting the absorbency characteristics of the paper after that time.

20 Claims, 6 Drawing Figures

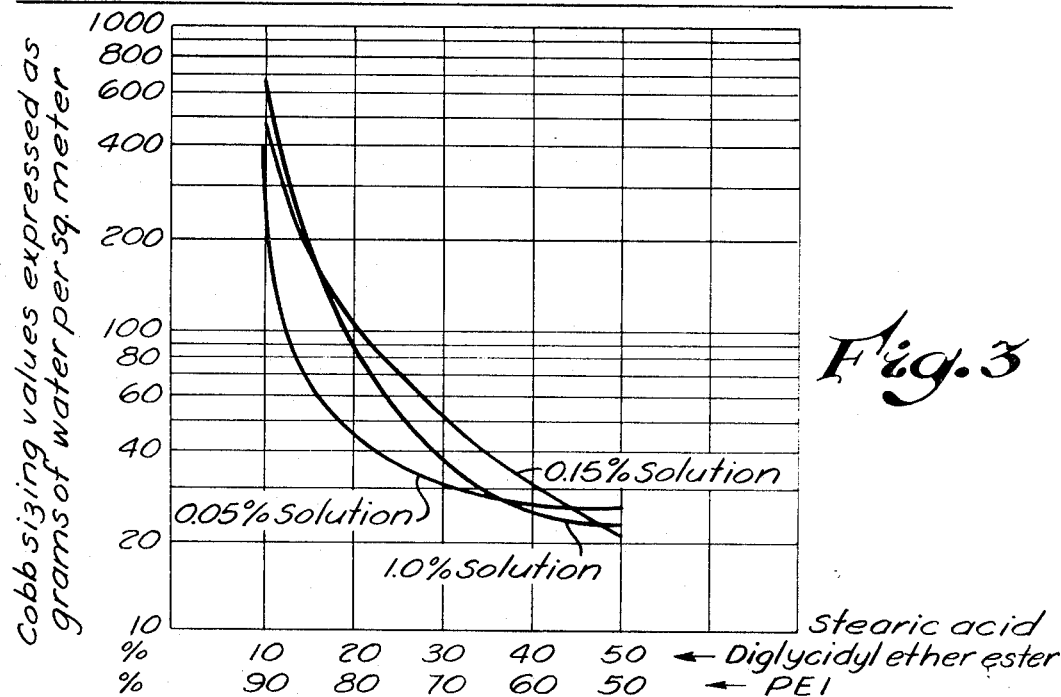
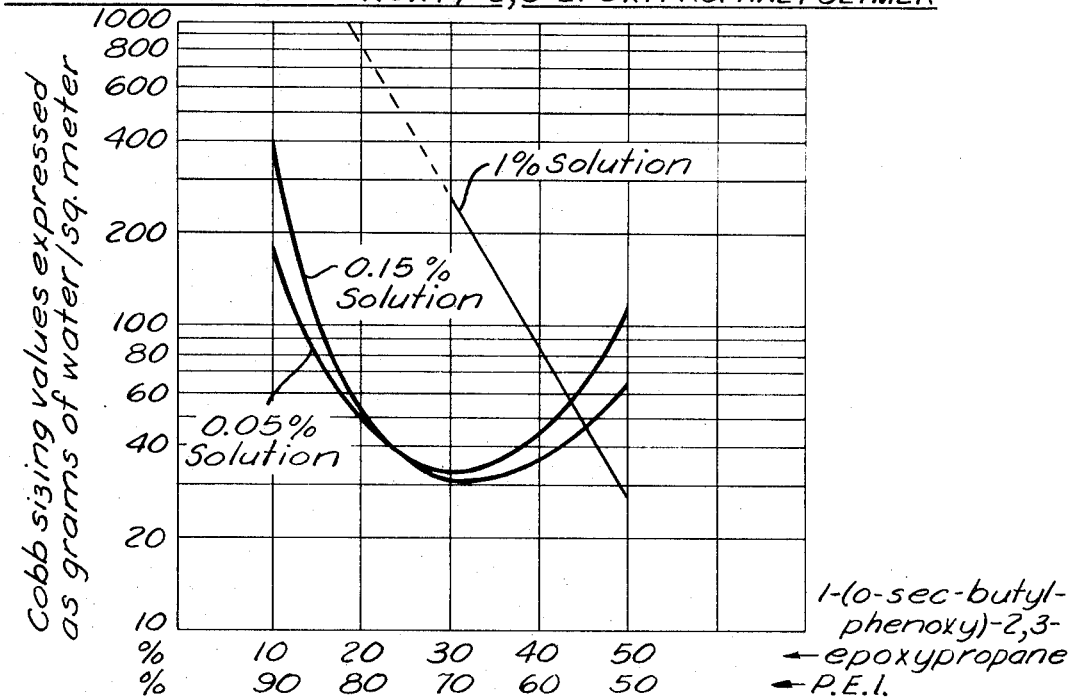

3,635,842

SHORT LIFE PAPER SIZE FROM MODIFIED POLYALKYLENE-IMINES

BACKGROUND OF THE INVENTION

The present invention relates to a process for producing a water-soluble polyalkylenimine or polyalkylenepolyamine having long chain groups substituted on the amine nitrogen and to the polymers so produced. More particularly, it relates to the reaction product and process for chemically combining a polyalkylenimine or polyalkylenepolyamine and an epoxy or activated aziridinyl monomer having an alkyl, aryl, alkaryl, or an ester group containing from about eight to about 20 carbon atoms. The water-soluble polymers of this invention possess a unique property as paper sizes. They impart a temporary sizing effect which disappears after some days without affecting the absorbency characteristics of the paper after that time. They are also useful for improving the wet and dry strength of paper and as a drainage aid in paper production.

Polyalkylenimine (hereinafter PAI) and polyalkylenepolyamine (hereinafter PAPA) are highly substantive to cellulosic pulp and paper. For this reason, the use of PAI and PAPA in the manufacture of paper, for example, as retention agents and for improving the strength of cellulosic products, is known in the art.

In order to improve the effect of PAI and PAPA in the manufacture of paper, various modifications of these polymers have been proposed. For example, U.S. Pat. No. 2,772,966, discloses a paper sizing composition prepared by heating a major amount of an ester gum with a minor amount of a water-soluble polyalkylenepolyamine. British Pat. No. 1,800,464, discloses water-soluble reaction products of PAI with epichlorohydrin. These compositions are useful for improving the wet strength of paper.

Paper sizes having a temporary effect, i.e., those which reduce the moisture absorption qualities of paper for a short time, are desirous for certain purposes. Such short life paper sizes would be well suited, for example, for the production of paper towels, absorbent tissue, cigarette paper, and the like. Temporary sizing will allow printing on such paper without affecting the absorbency qualities for the final use.

SUMMARY OF THE INVENTION

It has now been discovered that certain novel water-soluble, modified polyalkylenimines and polyalkylenepolyamines of this invention function well as short life paper sizes. The novel polymers of this invention are prepared by chemically combining with agitation from about 10 percent by weight to about 50 percent by weight, total reactant basis, of an activated aziridinyl or epoxy monomer having an alkyl, aryl, alkaryl, or an ester group containing from about eight to about 20 carbon atoms with from about 90 percent by weight to about 50 percent by weight, total reactant basis, of a water-soluble PAI or PAPA.

While the mechanism of the reactions involved in the present invention are not fully understood and applicants do not wish to be bound by any particular reaction theory, it is believed that the epoxy and aziridinyl rings of the monomers open and attach to both primary and secondary amine nitrogens in the PAI or PAPA. Thus, in the case of an epoxy monomer, a polymer of random structure having the following recurring groups is probably formed:

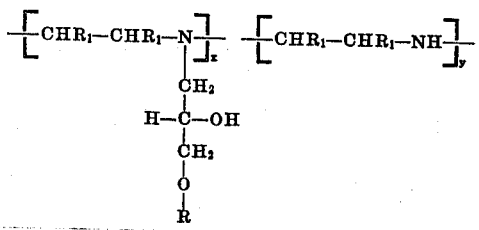

wherein R is an alkyl, aryl, alkaryl, or an acyl group containing from about eight to about 20 carbon atoms, $R_1$ is hydrogen or an alkyl group of from one to four carbon atoms, and the ratio of $x$ to $y$ depends on the relative ratio of reactants combined as indicated above. In the case of an activated aziridinyl monomer, a polymer of random structure having the following recurring groups probably results:

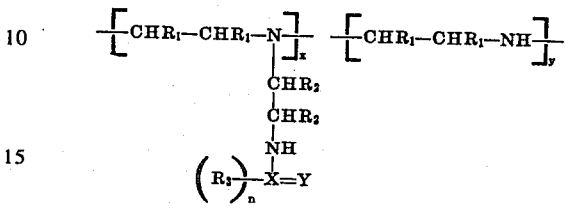

wherein X is carbon or phosphorus, Y is oxygen or sulfur, $n$ is 1 when X is carbon and 2 when X is phosphorus, $R_1$, $x$ and $y$ have the same meaning as indicated in the case of the epoxy monomer, $R_2$ is hydrogen or an alkyl group having from one to four carbon atoms, and $R_3$ is an alkyl, aryl, alkaryl, alkoxy, aryloxy or alkaryloxy group of from about eight to about 20 carbon atoms.

In general, any water-soluble PAI or PAPA is suitable for the practice of the present invention. Thus, suitable polyalkylenepolyamines include diethylenetriamine, triethylenetetraamine, tetraethylenepentamine, and the analogous polypropylenepolyamines and polybutylenepolyamines. Higher molecular weight polyalkylenepolyamines, for example, those having molecular weights up to 200,000 and higher are also suitable for the practice of this invention. They may be prepared by polymerizing the polyalkylenepolyamines listed above.

Suitable polyalkylenimines include water-soluble polyethylenimines (hereinafter PEI), polypropylenimines, and polybutylenimines having molecular weights from under 1,000 to 1,000,000 and higher. Methods for preparing such PAI are known in the art. The polymerization of alkyleneimines has been reviewed, for example, by Jones, "The Polymerization of Olefin Imines," in P. H. Plesch, ed., *The Chemistry of Cationic Polymerization*, New York, MacMillan (1963), pages 521–534.

In general, monomers having a terminal activated aziridinyl group or a terminal epoxy group and having an alkyl, aryl, alkaryl, or an ester group containing from about eight to about 20 carbon atoms are suitable for reaction with the PAI or PAPA to produce the polymers of this invention. Examples of suitable epoxy monomers include: 1-(p-dodecylphenoxy)-2,3-epoxy propane, 1-(o-sec-butylphenoxy)2,3-epoxy propane, 3-(2,3-epoxy propoxy)-2-hydroxypropyl stearate, 2,3-epoxy propyl benzoate, 2,3-epoxy propyl octadecenate, and the like. The preferred epoxy compounds are those having the general formula:

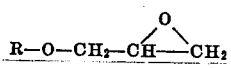

wherein R is an alkyl, aryl, alkaryl, or an acyl group containing from about eight to about 20 carbon atoms. Methods for preparing epoxy compounds useful for this invention and examples of suitable epoxy compounds are disclosed, for example, by A. M. Paquin, Epoxydverbindungen und Epoxydharze, Springer-Verlag (1958), especially page 247. The terminal epoxy group will open and attach to the polymeric amine chain without the presence of an activating bond or group proximate to the epoxy group.

As used herein, the term "activated aziridinyl monomer" refers to those aziridine compounds having a bond proximate thereto which makes the aziridine ring reactive so that it opens readily to react with the polymeric amines used herein. Activated aziridinyl monomers operable for the present invention may be represented by the general formula:

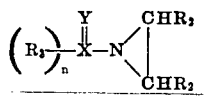

wherein X is carbon or phosphorus, Y is oxygen or sulfur, $n$ is 1 when X is carbon and 2 when X is phosphorus, $R_3$ is as defined above and $R_2$ is hydrogen or an alkyl group of from one to four carbon atoms. Examples of suitable activated aziridinyl monomers include dodecyl 1-aziridinyl carboxylate, didecyl 1-aziridinyl phosphonate, octadecyl 1-aziridinyl carboxylate, phenyl 1-aziridinyl carboxylate, didecyl 1-aziridinyl phosphine sulfide, and the like. Such aziridinyl compounds may be prepared by methods reviewed in H. Bestian et al., Ann. 566, 210–44 (1950).

In practice, the novel polymers of the present invention are prepared by combining the proportions by weight of the PAI or PAPA discussed previously, stirring the mixture until homogeneous, and allowing the mixture to stand for a sufficient time to allow completion of the reaction, i.e., for about 8 to about 20 hours. For PAI having a molecular weight above about 3,000 an inert solvent in which both the PAI and the epoxy or activated aziridinyl monomer are dispersible is preferably used. Suitable specific examples of such solvents include alcohols containing from one to about four carbon atoms such as methanol, ethanol, propanol, butanol, and the like; inert chlorinated solvents such as methylene chloride, ethylene chloride, perchloroethylene, and the like; aromatic hydrocarbons, such as toluene, benzene, and the like. With PAI having a molecular weight below about 3,000 and for PAPA, no solvent is needed since these polymers have low enough viscosities to serve as solvents themselves.

While the reaction between the activated aziridinyl or epoxy monomer and the PAI or PAPA can be accomplished at substantially room temperature, temperatures from about 0° up to as high as 95° C. can be used. Preferably, the temperature of the reaction system is within the range from about 20° to about 60° C.

The products of this invention are useful both as short life paper sizes and for improving the wet and dry strength properties of paper, paperboard and similar cellulosic materials. They may be applied to any of the stocks commercially used for the manufacture of paper, but they are preferably used to treat papers in which absorbency is desired in the final product with sizing desired for processing.

The polymers may be applied to paper by any of the commonly known methods. They are particularly adapted for application by the "beater" method in which the size is added to a dilute aqueous suspension of cellulosic fibers and deposited on the fibers before they are made into paper. Absorption of the size is rapid, and is often complete within 10 seconds, permitting the addition of the sizing agent at any desired point ahead of the wire, even in high speed papermaking machines. Where fillers are used, the fillers are more advantageously added after absorption of the size than before.

The sizes may also be applied by the "tub" sizing or impregnation method. In the tub method, the paper web is passed into an aqueous dispersion containing from about 0.05 percent by weight to about 1.0 percent by weight of the size, excess liquid is squeezed off by rolls, and the paper is dried. In the impregnation method, the aqueous dispersion or solution of the polymer is sprayed upon one or both sides of the paper, which is then squeezed and dried as in the case of tub sizing. In both instances, rapid and uniform pickup of the size takes place even when very dilute solutions are used because of the extremely cationic, cellulose-substantive nature of the size.

The preparation of paper according to this invention therefore in its broadest aspect consists in absorbing the requisite quantities of the aforementioned polymers upon the cellulosic fibers and drying the fibers. In contrast to many sizing agents and strength improvers for paper, curing of the polymers on the cellulosic fibers is not required to obtain the beneficial properties obtained from the polymers of this invention.

The invention will be further described and illustrated by the following specific examples which show the preparation of polymers representative of the present invention and the application thereof to paper. In order to demonstrate the sizing obtained through the use of these polymers, paper treated with them was evaluated by the Cobb test and the ink penetration test. The Cobb test is a measure of the weight of water or other test liquids that will be absorbed by the paper in a given period of time. The test is conducted by first weighing a sample 12.5 centimeters square, covering its central portion with a metal cylinder 10 centimeters in diameter and pouring 25 ml. of water or other test liquid into the cylinder. After 15 minutes (or other predetermined test time) the excess water is poured off, surface moisture is removed from the paper, and the sample is again weighed. The weight of the absorbed water is multiplied by 8 and the test results are reported as grams of moisture absorbed by a sheet 100 centimeters square.

FIGS. 1–5 represent semilogarithmic plots of Cobb sizing values obtained for different concentrations of the polymers of this invention in aqueous solution prepared from different percentages by weight of the activated aziridinyl or epoxy monomer and PEI. The Cobb sizing values are plotted on the logarithmic scale as indicated, and the percentages by weight of the epoxy or activated aziridinyl monomer and the PEI used to prepare the polymers is plotted on the arithmetic scale. The higher the Cobb sizing value, the less desirable is the sizing agent. A sample of unsized kraft paper will absorb about 1,200 g. of water per square meter while kraft paper treated with a good sizing agent will absorb less than about 100 g. of water per square meter. These values correspond to the Cobb sizing values. The graphs will be explained in more detail in the examples below.

The ink penetration test is a measure of the time in seconds required for ink to soak through the paper, as measured by a photovolt meter with a tristimulus filter on the photoelectric cell. This time will vary from a few seconds in the case of the controls to well over 1,000 seconds in the case of hard sized papers. The test is conducted by first fastening a 2- by 2-inch sample of the paper to be evaluated on top of the cell by means of a ring clamp paper holder. A black cavity is then placed on top of the paper holder, and the galvanometer is adjusted to 100 by means of the sensitivity controls. The black cavity is removed, and ink is poured on the exposed paper inside the ring clamp until the ink level is even with the top of the clamp. The elapsed time until the galvanometer reads 50 is then measured. In order to reduce the time for testing highly sized paper, the galvanometer reading is made after 1,000 seconds when the galvanometer has not dropped to 50 by that time (e.g., 1,000 seconds at 90 percent). In this test, the higher the value in seconds or the higher the reading on the galvanometer after 1,000 seconds, the better is the sizing.

The following examples describe completely representative specific embodiments of the invention claimed and the best modes contemplated by the inventors for practicing the claimed invention. The scope of the invention is limited, however, only by the scope of the claims appended hereto.

EXAMPLE 1

Into a vessel equipped with stirring means were placed 25 g. of a solution of PEI having a molecular weight of about 1,000,000 as determined by viscosity measurement and consisting of 25 percent by weight solids in n-butanol. To this was added 6.2 g. of dodecyl 1-aziridinyl carboxylate (dodecyl aziridinyl formate). The weight ratio of reactants was 50 percent PEI to 50 percent dodecyl aziridinyl formate. The above mixture was stirred until homogeneous and allowed to stand at room temperature (25° C.) for 16 hours.

The resulting polymer product was evaluated as a paper size by treating unsized, unbleached kraft paper with a size bath consisting of an emulsion of 0.05 percent by weight solids of the above product in water. A 6- by 6-inch sample of paper was completely submerged in this bath and allowed to remain for one minute. At the end of this time, the paper was removed from the bath, blotted ro remove excess sizing solution, and dried. The sizing properties of the polymers were evaluated by the Cobb test described previously. A sample of paper treated in this manner had a Cobb sizing value of 23, while an unsized sample of the same paper had a Cobb sizing value of 1,200. As used herein, the polymers are considered to give good sizing results when they give a Cobb sizing value of less than about 100.

Similar polymers were prepared from 10 percent by weight dodecyl aziridinyl formate and 90 percent by weight PEI, and from 30 percent by weight dodecyl aziridinyl formate and 70 percent by weight PEI. Each of the polymers prepared above was evaluated as a paper size at 0.05 percent by weight, 0.15 percent by weight, and 1 percent by weight aqueous solution concentrations. FIG. 1 is a graph of the results obtained.

Best results appear to be obtained with this polymer composition in the more dilute solution prepared from about 20 percent by weight to about 50 percent by weight of the dodecyl aziridinyl formate and from about 80 percent by weight to about 50 percent by weight of the PEI.

Similar advantageous results were obtained when paper was sized with the reaction product of PEI having a molecular weight of about 5,000 and dodecyl aziridinyl formate.

EXAMPLE 2

Water-soluble polymers were prepared according to the procedure of example 1 from PEI having a molecular weight of about 1,000,000 as determined by viscosity measurements and 1-(p-dodecylphenoxy)-2,3-epoxy propane (dodecylphenyl glycidyl ether); from 85.5 percent by weight PEI and 14.5 percent by weight dodecylphenyl glycidyl ether; from 73.5 percent by weight PEI and 26.5 percent by weight dodecylphenyl glycidyl ether; and from 53 percent by weight PEI and 47 percent by weight dodecylphenyl glycidyl ether.

These polymers were evaluated as paper sizing agents according to the procedure in example 1 as aqueous solutions containing 1 percent by weight, 0.15 percent by weight, and 0.05 percent by weight of the polymers. The results are shown in FIG. 2.

Figure 2:
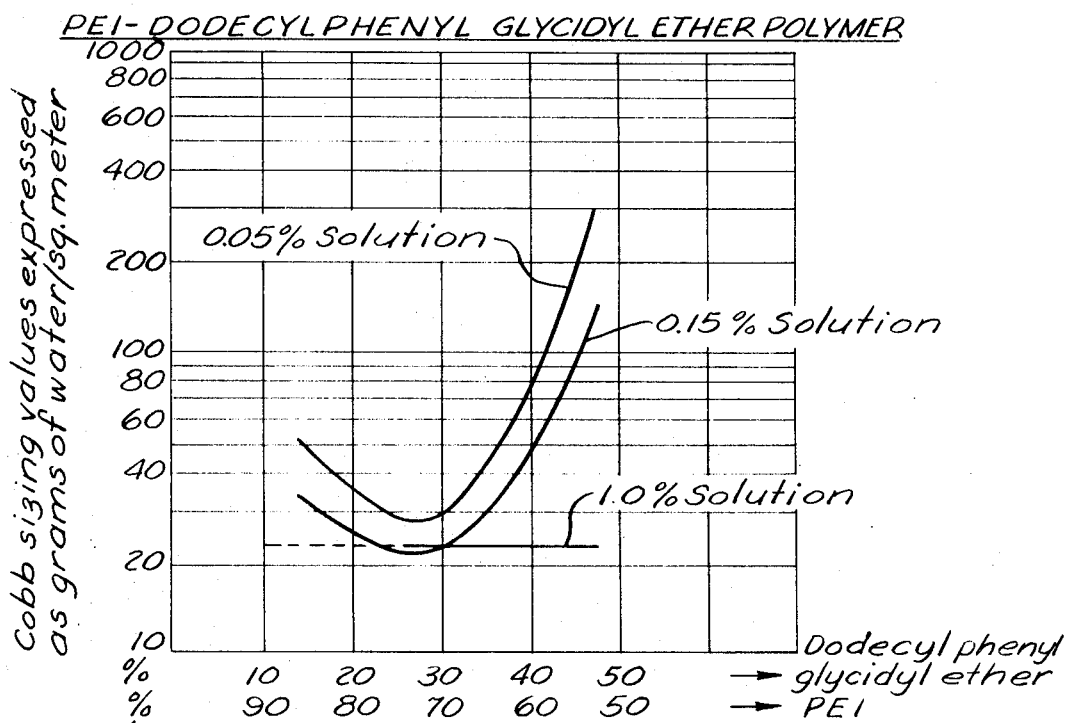
Figure 5:
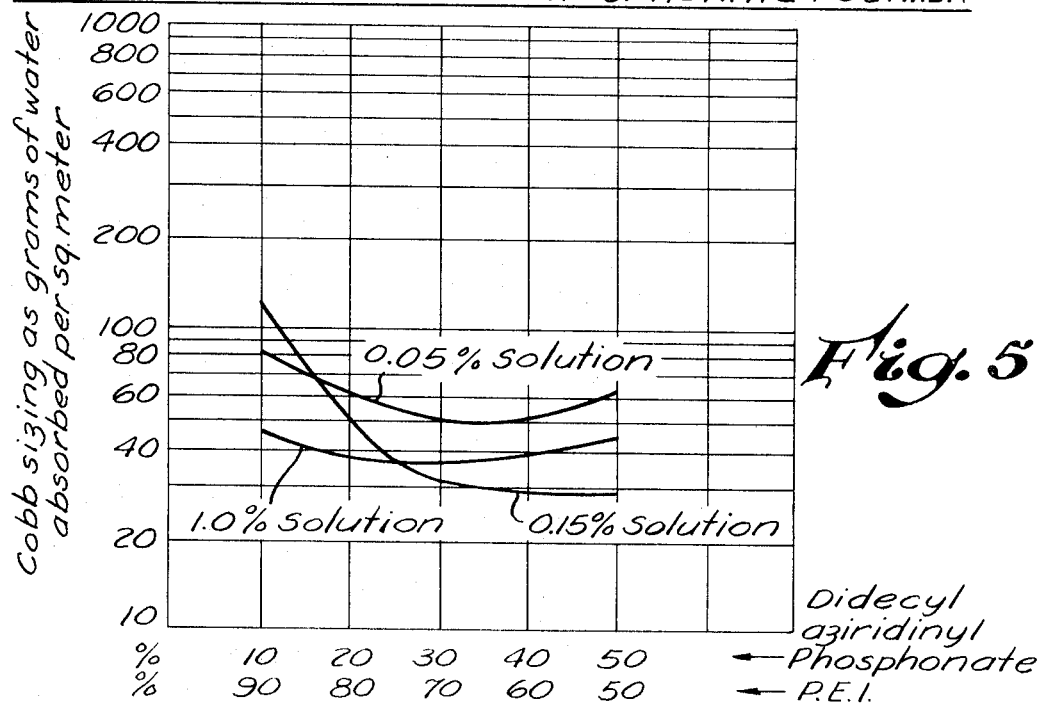

As shown by FIG. 2, good sizing results are obtained with the PEI-dodecylphenyl glycidyl ether polymer solution in the more dilute concentrations containing from about 10 percent by weight to about 40 percent by weight dodecylphenyl glycidyl ether and from about 90 percent by weight to about 60 percent by weight PEI, and with the more concentrated solution, good sizing results are obtained throughout the composition range.

EXAMPLE 3

Polymers were prepared as in examples 1 and 2 from PEI and 3-(2,3-epoxypropoxy)-2-hydroxypropyl stearate (stearic acid diglycidyl ether ester). The polymers were prepared from 10 percent by weight of the monomer and 90 percent by weight PEI, from 30 percent by weight monomer and 70 percent by weight PEI and from 50 percent by weight monomer and 50 percent by weight PEI. Each of these polymers was tried as a paper size at 0.05 percent by weight, 0.15 percent by weight and 1 percent by weight aqueous solution concentrations. The results are shown in FIG. 3. FIG. 3 shows that good sizing values can be obtained from the PEI-stearic acid diglycidyl ether ester polymer prepared from about 20 percent by weight to about 50 percent by weight of the stearic acid diglycidyl ether ester and from about 80 percent by weight to about 50 percent by weight of the PEI.

EXAMPLE 4

As in examples 1-3, polymers were prepared from PEI and 1-(o-sec-butylphenoxy)-2,3-epoxy propane. The polymers were prepared from 10 percent by weight of the monomer and 90 percent by weight PEI, from 30 percent by weight monomer and 70 percent by weight PEI, and from 50 percent by weight monomer and 50 percent by weight PEI. These polymers were evaluated as paper sizes, giving the results shown in FIG. 4. FIG. 4 shows that the more dilute polymer solution prepared from about 15 percent by weight to about 50 percent by weight of the 1-(o-sec-butylphenoxy)-2,3-epoxy propane and from about 85 percent by weight to about 50 percent by weight PEI gave good sizing values. Good sizing values were also obtained with the 1 percent by weight solution prepared from 50 percent by weight of the monomer and 50 percent by weight of the PEI.

EXAMPLE 5

As in examples 1-4, polymers were prepared from PEI and didecyl 1-aziridinyl phosphonate. The polymers were prepared from 10 percent by weight of the monomer and 90 percent by weight PEI, from 30 percent by weight monomer and 70 percent by weight PEI, and from 50 percent by weight monomer and 50 percent by weight PEI. These polymers were evaluated as sizing agents with the results shown in FIG. 5. These polymers appear to give good sizing results in both the dilute and the more concentrated solutions through the whole range evaluated.

Similar advantageous results are obtained when diethylenetriamine, triethylenetetraamine, tetraethylenepentamine, the analogous polypropylenepolyamines, polybutylenepolyamines, polypropylenimines, and polybutylenimines are substituted for the PEI in examples 1-5.

EXAMPLE 6

Figure 6:
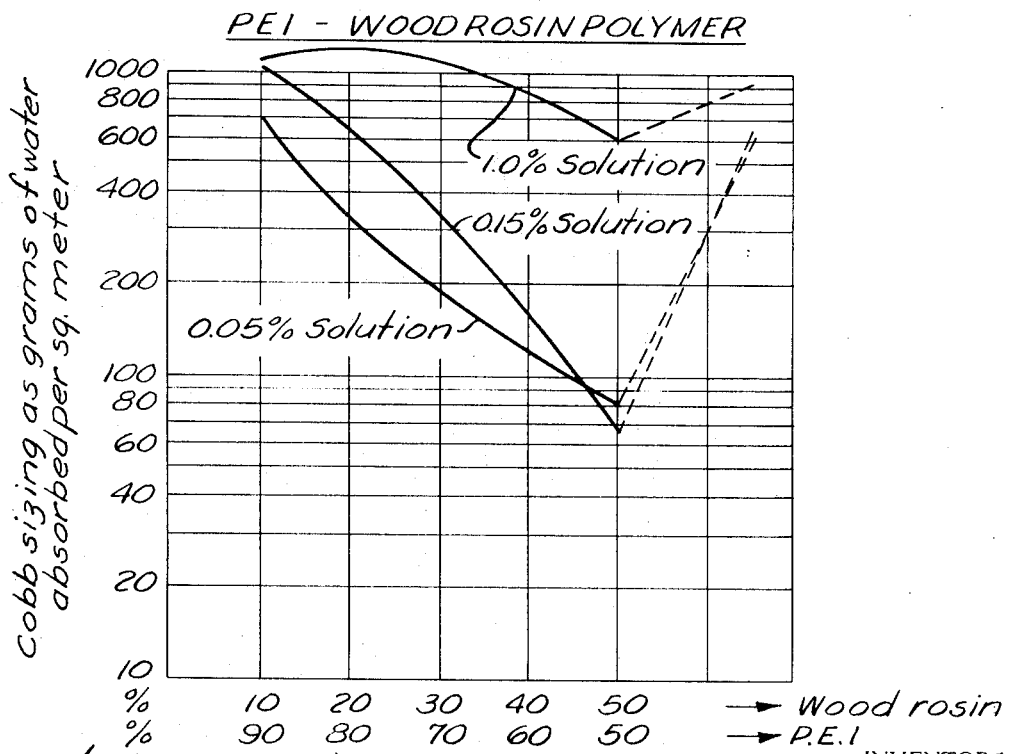

For comparative purposes, PEI and wood rosin were combined according to the procedures used in examples 1-5, and the resulting polymers evaluated as a paper size. The results are shown in FIG. 6. Cobb sizing values below 100 were obtained from compositions prepared with 50 percent by weight rosin and 50 percent by weight PEI in the 0.05 percent by weight solution and the 0.15 percent by weight solution. The Cobb sizing value for the other percentages and concentrations range up to 1,000 and higher.

EXAMPLE 7

The effectiveness of a polymer prepared from 50 percent by weight of didecyl 1-aziridinyl phosphonate and 50 percent by weight PEI according to the procedure of example 5 for addition by the beater method was evaluated. The polymer was added as a 1 percent by weight water solution to 250 ml. of a dilute paper stock containing 1.2 g. of bone dry unbleached sulfite spruce pulp (400 ml. Canadian Standard Freeners). The slurry was stirred for 1 minute, then a handsheet was formed on a standard British Handsheet Machine (T.A.P.P.I. Method T205). The treated sheets were dried for 1 minute at 150° C. The dried sheets were evaluated by the ink penetration test described previously, with the results shown below in table I. The sizing values shown below were obtained first, at the time of preparation, and second, after 15 days of storage at room temperature (i.e., about 25° C.).

TABLE I

| Handsheet | Loading (pounds polymer/ton pulp) | Seconds for ink penetration (initial) | Galvanometer reading (percent reflectance) | Seconds for ink penetration (after 15 days) | Galvanometer reading (perent reflectance) |
|---|---|---|---|---|---|
| 1 | 16.7 | 4 | 50 | 2 | 50 |
| 2 | 33.3 | 1,000 | 70 | 350 | 50 |
| 3 | 50.0 | 1,000 | 79 | 566 | 50 |
| 4 | 66.6 | 1,000 | 90 | 979 | 50 |
| 5 | 83.3 | 808 | 50 | 674 | 50 |
| 6 | 100 | 287 | 50 | 284 | 50 |
| 7 | ¹0 | <4 | 50 | | |

¹ Blank.

EXAMPLE 8

The effectiveness of polymers prepared from PEI and dodecyl aziridinyl formate according to the procedure of example 1 was evaluated for addition by the beater method. The polymers were prepared from 90 percent by weight PEI and 10 percent by weight dodecyl aziridinyl formate (product A), 70 percent by weight PEI and 30 percent by weight monomer (product B), and 50 percent by weight PEI and 50 percent by weight monomer (product C). The polymers were added to a slurry containing an unbleached sulfite spruce pulp (230 ml. Canadian Standard Freeners), in a concentration of 1.2 g. pulp/180 ml. slurry. The polymers were added to the slurry and the resulting mixture stirred for 30 seconds. Handsheets were made and evaluated by the ink penetration test as in example 7, immediately and after 6 days of storage.

For comparison, a commercial sizing agent (Cyron size) sold by the American Cyanamid Company, New York, N. Y., and identified as the reaction product of stearic acid and a polyalkylenepolyamine, was evaluated under the same conditions. The results are shown below in table II.

TABLE II

| Handsheet number | Product | Loading (pounds polymer/ton pulp) | Seconds for ink initial | Penetration [1] |
|---|---|---|---|---|
| 1 | A | 5 | 2 | 2 |
| 2 | A | 10 | 4 | 2 |
| 3 | A | 15 | 14 | 6 |
| 4 | B | 5 | 2 | |
| 5 | B | 10 | 5 | |
| 6 | B | 15 | 114 | |
| 7 | C | 5 | 2 | 2 |
| 8 | C | 10 | 21 | 2 |
| 9 | C | 15 | 655 | 258 |
| 10 | Blank | 0 | 2 | 2 |
| 11 | Cyron size | 5 | 2 | |
| 12 | Cyron size | 10 | 2 | |
| 13 | Cyron size | 15 | 2 | |

[1] 50% reflectance after 6 days at 25° C.

A polymer product prepared from 41 percent by weight PEI and 59 percent by weight dodecyl aziridinyl formate gave good sizing results but was not stable in water. A polymer product prepared from 26 percent by weight PEI and 74 percent by weight dodecyl aziridinyl formate was even less stable in water. Solids precipitated from the solution, and it could not be checked for sizing.

What is claimed is:

1. A water-soluble polymer consisting essentially of the reaction product of from 10 percent to 50 percent by weight, total reactant basis of A.-1: an activated aziridinyl monomer having the structural formula

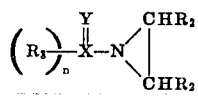

wherein $R_1$ is hydrogen or alkyl of from one to four carbon atoms, $R_3$ is an alkyl, aryl, alkaryl, alkoxy, aryloxy or alkaryloxy of from eight to 20 carbon atoms, X is carbon or phosphorus, Y is oxygen or sulfur, and $n$ is 1 when X is carbon and 2 when X is phosphorus, or 2: an epoxy monomer having the structural formula

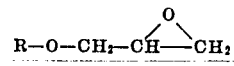

wherein R is an alkyl, aryl, alkaryl or acyl group of from eight to 20 carbon atoms;

with from about 90 percent to 50 percent by weight, total reactant basis, of

B. a polyalkylenepolyamine or polyalkylenimine.

2. A process for producing the water-soluble polymer defined by claim 1 comprising reacting by contacting (A) said activated aziridinyl monomer or epoxy monomer with (B) said polyalkylenepolyamine or polyalkylenimine.

3. The process defined by claim 2 wherein A is said activated aziridinyl monomer.

4. The process defined by claim 3 wherein $R_3$ is alkoxy.

5. The process defined by claim 2 wherein A is said epoxy monomer.

6. The process defined by claim 5 wherein A has the structural formula

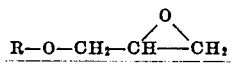

wherein R is alkyl, aryl, alkaryl or acyl.

7. Paper sized with the water-soluble polymer defined by claim 20.

8. The process of claim 2 wherein the polyalkylenimine has a molecular weight of at least about 3,000 and is combined with the activated aziridinyl or epoxy monomer in the presence of an inert solvent in which the polyalkylenimine and the activated aziridinyl or epoxy monomer are dispersible.

9. A water-soluble polymer product of the process of claim 8.

10. Paper sized with a water-soluble polymer product produced by the process of claim 8.

11. The process of claim 8 in which the polyalkylenimine is polyethylenimine, and the epoxy or activated aziridinyl monomer is, respectively, 1-(p-dodecylphenoxy)-2,3-epoxy propane, 1-(o-sec-butylphenoxy)-2,3-epoxy propane, 3-(2,3-epoxy propoxy)-2-hydroxypropyl stearate; or dodecyl 1-aziridinyl carboxylate or didecyl 1-aziridinyl phosphonate.

12. The water-soluble polymer defined by claim 1 wherein (A) is said epoxy monomer.

13. The water-soluble polymer defined by claim 12 wherein R is dodecylphenyl, stearoyl, or o-sec-butylphenyl.

14. The water-soluble polymer defined by claim 12 wherein (B) is polyethyleneimine or polyethylenepolyamine.

15. The water-soluble polymer defined by claim 14 wherein R is dodecyl, stearoyl, or o-sec-butylphenyl.

16. The water-soluble polymer defined by claim 1 wherein (A) is said activated aziridinyl monomer.

17. The water-soluble polymer defined by claim 16 wherein Y is oxygen.

18. The water-soluble polymer defined by claim 17 wherein $R_2$ is hydrogen.

19. The water-soluble polymer defined by claim 16 wherein (B) is polyethylenimine and polyethylenepolyamine.

20. The water-soluble polymer defined by claim 19 wherein Y is oxygen, $R_2$ is hydrogen, and $R_3$ is dodecyl.

* * * * *

PO-1050
(5/69)

UNITED STATES PATENT OFFICE
CERTIFICATE OF CORRECTION

Patent No. 3,635,842  Dated 18 January 1972

Inventor(s) Juan Longoria, III and William P. Coker

It is certified that error appears in the above-identified patent and that said Letters Patent are hereby corrected as shown below:

Column 8, line 30, delete "claim 20." and insert --claim 1.--

Signed and sealed this 29th day of August 1972.

(SEAL)
Attest:

EDWARD M. FLETCHER, JR.
Attesting Officer

ROBERT GOTTSCHALK
Commissioner of Patents